Sept. 22, 1970  E. W. TODD ET AL  3,529,674
FOLDABLE MULTIPLE SECTION EARTHWORKING IMPLEMENT
Filed April 1, 1968  4 Sheets-Sheet 1

INVENTORS.
EVERETT W. TODD
GUY F. GARDNER

Tweedale & Gerhardt
ATTORNEYS.

Sept. 22, 1970   E. W. TODD ET AL   3,529,674
FOLDABLE MULTIPLE SECTION EARTHWORKING IMPLEMENT
Filed April 1, 1968   4 Sheets-Sheet 3

INVENTORS.
EVERETT W. TODD
GUY F. GARDNER

Tweedale & Gerhardt
ATTORNEYS.

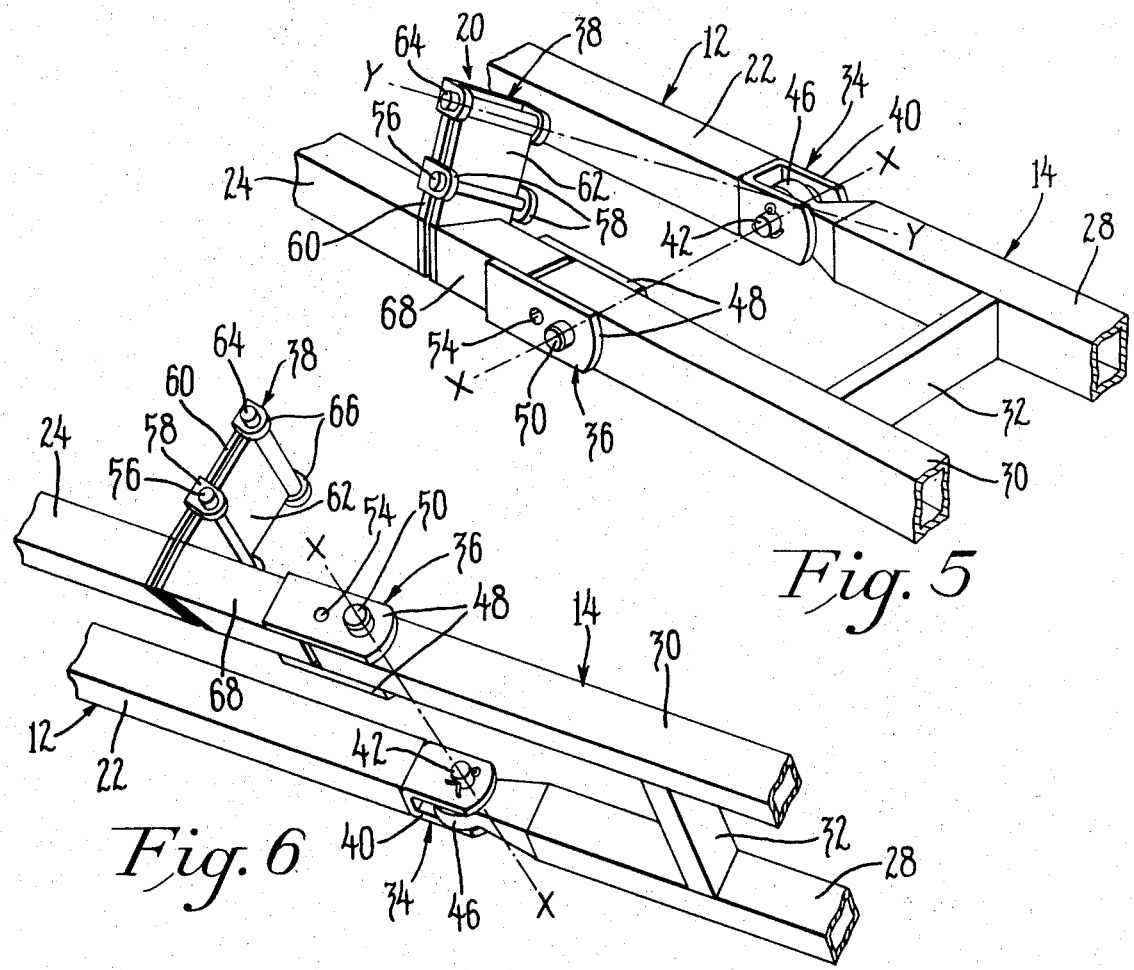
Fig. 5
Fig. 6
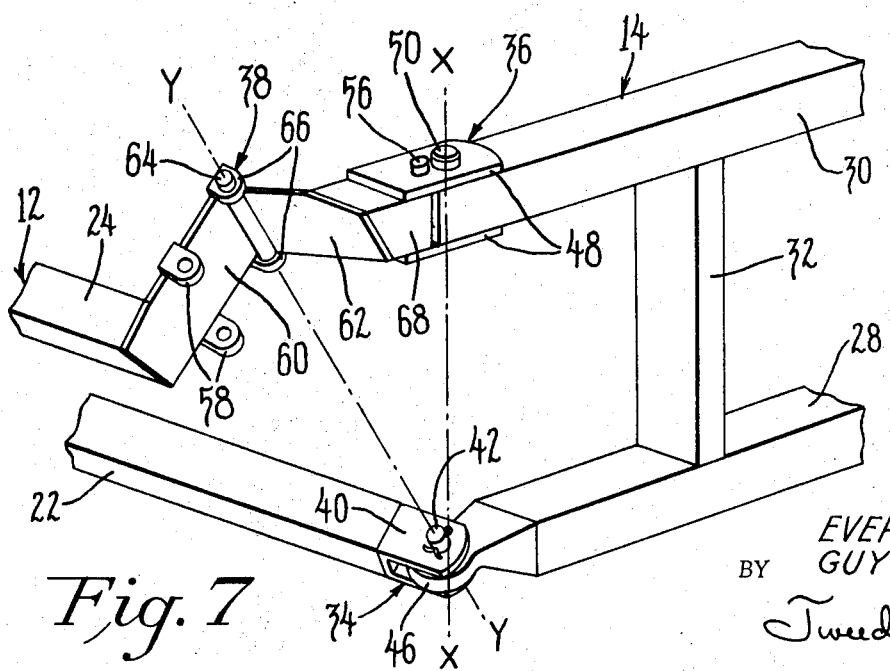
Fig. 7

United States Patent Office 3,529,674
Patented Sept. 22, 1970

1

3,529,674
FOLDABLE MULTIPLE SECTION EARTHWORKING IMPLEMENT
Everett W. Todd and Guy F. Gardner, Dearborn, Mich., assignors to Massey-Ferguson Inc., Des Moines, Iowa, a corporation of Maryland
Filed Apr. 1, 1968, Ser. No. 717,818
Int. Cl. A01b 73/00
U.S. Cl. 172—311          6 Claims

ABSTRACT OF THE DISCLOSURE

A foldable, multiple section earthworking implement including a main center section and a pair of side sections connected with the ends of the center section for pivotal movement between a coplanar working position and a forwardly folded transport position relative to the center section. In the transport position, the side sections lie in a substantially fore and aft vertical plane and the center section lies in a transverse plane tilted from the horizontal to an angle of substantially less than 90 degrees.

BACKGROUND OF THE INVENTION

Field of the invention

This invention relates generally to implements for supporting a plurality of earthworking tools such as cultivators or chisel plows and is particularly concerned with multiple section implements that can be folded to a transport position from an extended working position to reduce the width of the implement during transport.

Description of the prior art

It is conventional to provide a tool carrying implement having side sections attached to a main center section for carrying additional tools and extending the working swath of the implement, and to provide for folding the side sections relative to the center section to reduce the width of the machine for transport between earthworking operations.

U.S. Pat. 1,927,458 dated Sept. 19, 1933 discloses a harrow having a main center section and a pair of side sections connected to its ends by a hinge assembly that permits up and down pivotal movement of the side members during earthworking operations to accommodate unevenness in the ground. For transport, the center section is tilted forwardly to elevate the earthworking tools to a non-earth engaging position and the side members are folded forwardly to a transport position. In the transport position, the center section lies in a transverse plane tilted with respect to the horizontal, and the side sections lie in generally fore and aft extending planes which are similarly tilted relative to the horizontal so that the total width of the machine is equal to the length of the center section plus the projected tilted width of the side sections in the transport position.

U.S. Pat. 2,970,658 discloses a multiple section implement having a main center section which must be tilted to a vertical plane before the side sections can be folded forwardly to their transport position to reduce the width of the machine.

An object of this invention is to provide a multiple section earthworking implement having a center section and one or more side sections connected therewith in such a manner that when the center section lies in a transverse plane tilted forwardly to an angle of substantially less than 90 degrees, the side sections can be folded forwardly to lie in a fore and aft vertical plane to obtain the maximum reduction in the width of the implement from its extended working position.

Another object is to provide a multiple section earthworking implement having a main center section and one or more side sections connected thereto such that the side sections can pivot about a horizontal fore and aft working axis during earthworking operations to accommodate unevenness in the ground when the side sections are in their extended, coplanar position relative to the center section, and can be folded about a folding axis for transport when the main frame is tilted slightly forwardly from its working position, the side section being foldable to a position in which they lie in a substantially vertical fore and aft extending plane.

SUMMARY OF THE INVENTION

In accordance with the present invention, one end of the side section is connected with one end of a main center section such that during earthworking operations the center and side sections lie in a substantially horizontal plane. The ends of the side and center sections are connected together by a hinge means which defines a working axis that extends horizontally in a fore and aft direction when the sections are in their horizontal working positions to permit pivotal movement between the sections for accommodating undulations in the ground surface. To fold the implement to a transport position, the working axis is deactivated and the center section is tilted slightly forwardly by fully extending an extensible and retractable power member interconnected between the implement hitch and the center section. The side section can then be folded forwardly about a folding axis which has both a vertical and horizontal inclination relative to the working axis such that the side section can be folded to a position in which it lies in a vertical plane that extends in substantially fore and aft direction.

BRIEF DESCRIPTION OF THE DRAWINGS

FIGS. 5, 6 and 7 are perspective views of the hinge means of FIGS. 3 and 4 in alternate positions; and FIG. 8 is a fragmentary side elevation of the folded implement at the hinge point.

FIG. 1 illustrates a tractor T to which is attached a multiple section earthworking implement designated generally by reference numeral 10. Implement 10 includes a main center section 12 and a pair of side sections 14 and 16. Each of the sections 12, 14 and 16 support a plurality of chisel plows or cultivating tools 18.

In FIG. 1, the center section 12 and side sections 14, 16 are shown in their earthworking position with the sections lying in a transverse, generally horizontal plane, the side sections 14, 16 extending from opposite ends of the center section in substantially coplanar relationship therewith. One end of each of the side sections is connected with one end of the center section by hinge means indicated generally by reference numeral 20 and which defines both a working axis X—X and a folding axis Y—Y (FIGS. 3 and 4). In the earthworking position of the implement as shown in FIG. 1, the working axis X—X extends horizontally in a fore and aft direction and the side sections pivot relative to the center section about the working axis X—X to accommodate unevenness in the ground surface.

Figure 3:
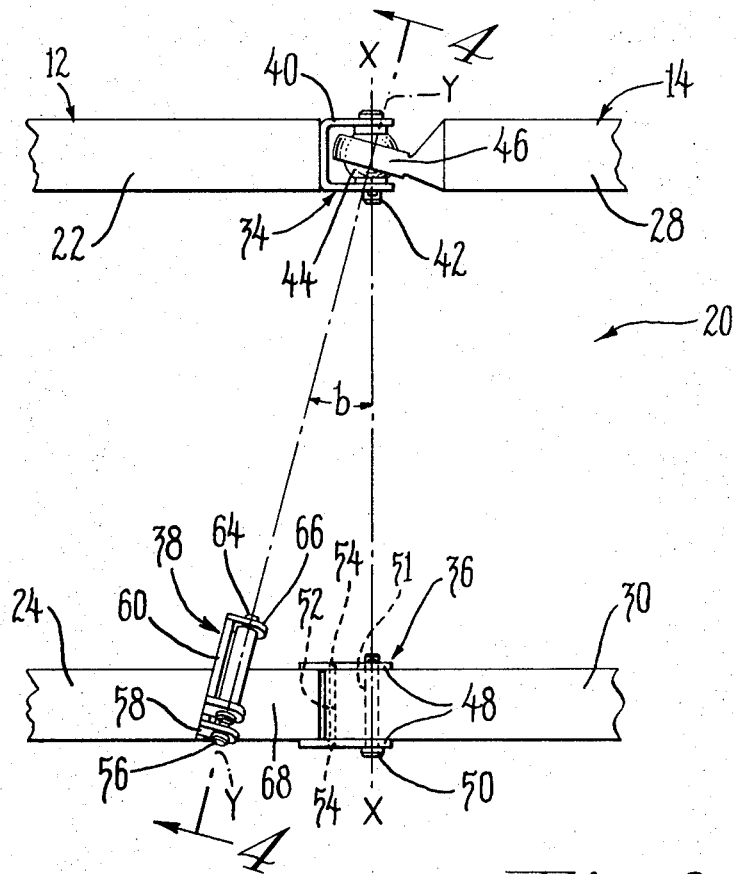
FIG. 3 is a plan view of the hinge means connecting the center section and side sections.
Figure 4:
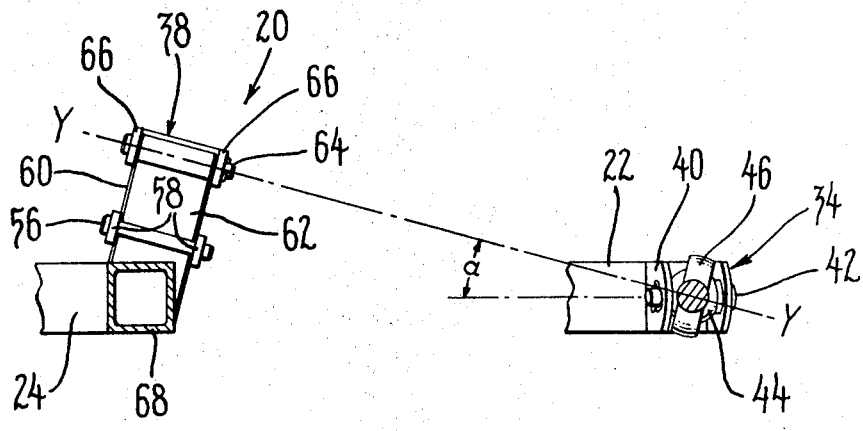
FIG. 4 is a view taken along lines 4—4 of FIG. 3.

As shown most clearly in FIG. 4, the folding axis Y—Y has a vertical angle of inclination $a$ relative to the working axis in a plane transversed to the plane of the center section such that the folding axis extends rearwardly and upwardly (or upwardly and toward the left as viewed in FIG. 4) from the front of center section. As illustrated most clearly in FIG. 3, the folding axis Y—Y has a horizontal angle of inclination $b$ relative to the working axis in the plane of the center section 12 such that the folding axis extends rearwardly and inwardly (toward the left as viewed in FIG. 3) toward the opposite end of the center section from the front of the center section.

Therefore, if the side section 14 is folded 90 degrees about the folding axis Y—Y in a counterclockwise direction as viewed from the lower side of FIG. 3, the working axis will assume an angle $a+b$ relative to the plane of the center section 12. Thus, assuming angles $a$ and $b$ to each be equal to 15 degrees, when the center section is tilted forwardly to an angle of 60 degrees relative to the horizontal, the side section 14 will lie in a fore and aft extending vertical plane when folded 90 degrees about axis Y—Y. In other words, the center section 12 has to be titled only to an angle relative to the horizontal which is complementary to the sum of the horizontal and vertical angles of inclination $a$ and $b$ of axis Y—Y in order to fold the side section forwardly to a vertical fore and aft extending plane, and is not required to be tilted vertically.

Figure 1:
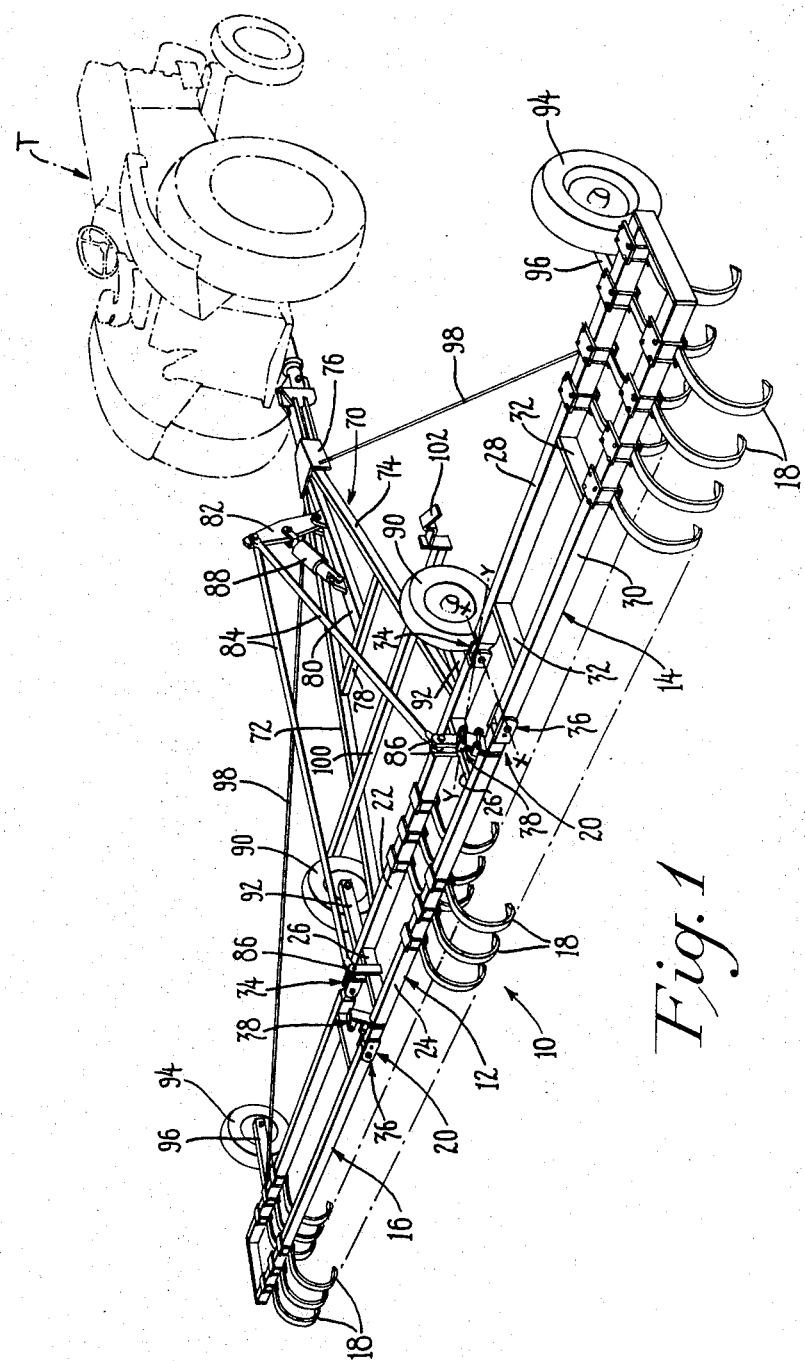
FIG. 1 is a perspective view of an implement embodying the invention with the implement shown in its extended, earthworking position.

With reference to FIG. 1, the center section 12 is made up of front and rear transverse frame members 22 and 24, respectively, secured together in spaced parallel relationship by longitudinal connecting members 26. The side section 14 is made up of front and rear frame members 28 and 30, respectively, secured together in spaced parallel relationship by connecting members 32. The side section 16 is identical to side section 14 except that the side sections are right and left-hand opposites, and will therefore not be described in detail.

The hinge means 20 connecting one end of side section 14 with one end of the center section 12 is shown in detail in FIGS. 3–7 and includes a front universal hinge 34 connecting the front frame member 22 of center section 12 with the front frame member 28 of side section 14, a working hinge 36 spaced rearwardly of the universal hinge so as to define the working axis X—X with the universal hinge, and a folding hinge 38 which is spaced inwardly of the working hinge and rearwardly of the universal hinge to define the folding axis Y—Y with the universal hinge. The working hinge 36 and folding hinge 38 connect the rear frame member 24 of center section 12 with the rear frame member 30 of side section 14.

The universal hinge 34 includes a clevis member 40 mounted on the end of the front frame member 22 of center section 12, a hingle pin 42 mounted between the parallel arms of clevis 40, a ball 44 mounted on pin 42 and a socket member 46 receiving ball 44, the socket member 46 being mounted on the front frame member 28 of side section 14. As shown in FIG. 3, the socket member 46 extends from frame member 28 so as to lie in a plane transverse to the folding axis Y—Y.

The working hinge 36 includes a pair of hinge plates 48, a hinge pin 50 which passes through aligned apertures in hinge plates 48 and an opening 51 in the rear frame member 30 of side section 14, a locking hole 52 near the end of frame member 30, and aligned locking pin holes 54 in hinge plates 48 coaxial with respect to hole 52. In FIG. 3, frame member 30 is free to pivot about axis X—X which also defines the longitudinal axis of pin 50. The working hinge 36 can be deactivated by inserting a locking pin 56 in the aligned holes 52 and 54 to thereby lock member 30 against pivotal movement about the axis of pin 50.

Locking pin 56 is shown in FIGS. 3–6 received in a pair of apertured ears 58 formed on a fixed hinge plate 60 of the folding hinge 38. Plate 60 is welded or otherwise secured to the end of the rear frame member 24. Locking pin 56 prevents pivotal movement between plate 60 and a movable hinge plate 62 which in turn is pivotally connected to plate 60 by a pin 64 mounted in apertured ears 66 at the upper end of the fixed plate 60. An extension leg 68 is welded or otherwise secured to the lower end of the movable hinge plate 62 and, in the position shown in FIGS. 3–6, forms a coaxial extension with frame member 24. The hinge plates 48 of the working hinge 36 are welded or otherwise secured to the extension leg 68.

The folding hinge pin 64 is positioned above the plane of the center section 12 and is in coaxial relationship with the folding axis Y—Y. When it is desired to unlock the folding hinge 38, the locking pin 56 is removed from ears 58 to release the folding hinge. In theis condition, the side section 14 can pivot relative to the center section 12 about both axis X—X and Y—Y as shown in FIG. 7.

Figure 2:
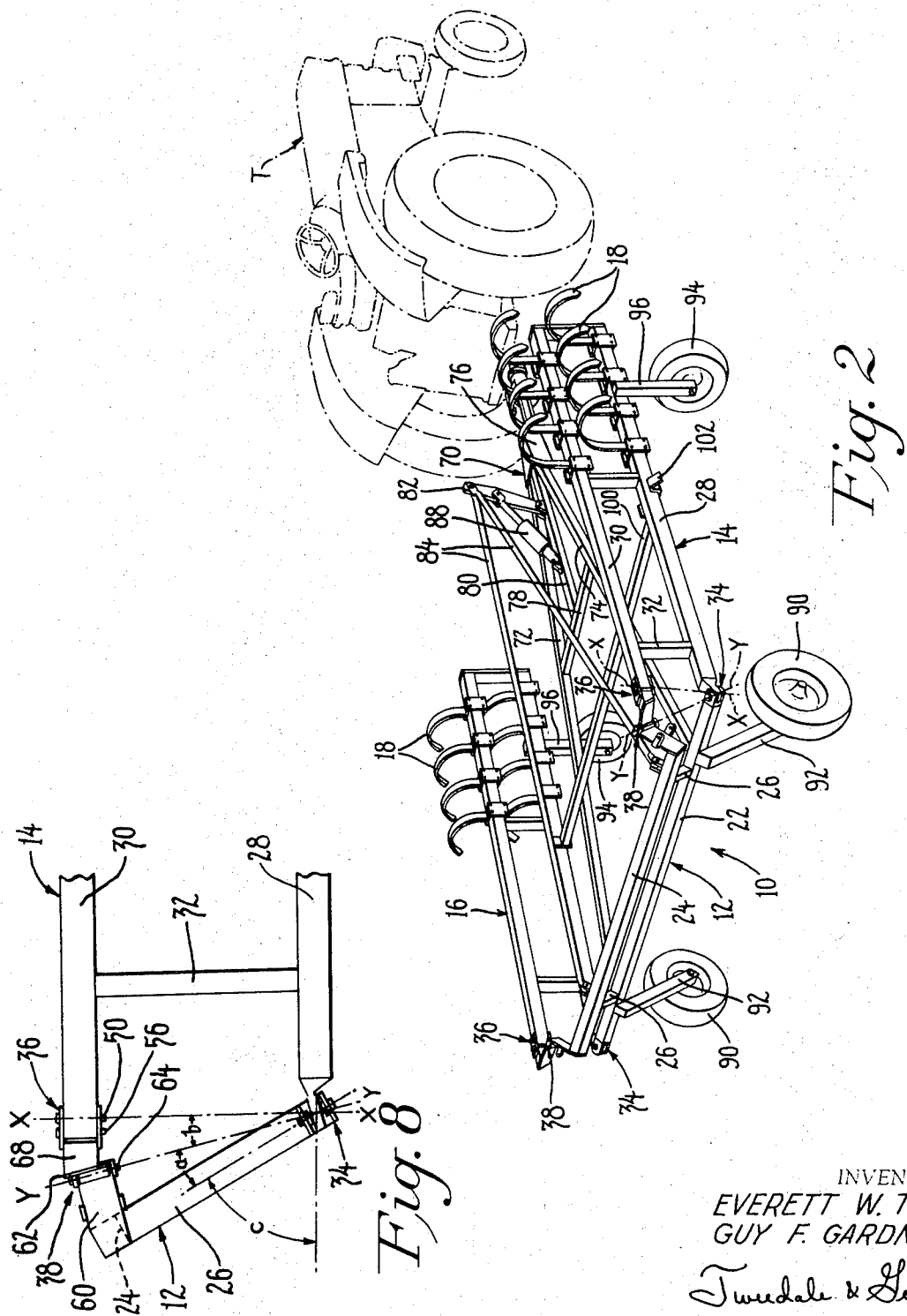
FIG. 2 is a perspective view of the implement of FIG. 1 in its folded, transport position.

With reference to FIGS. 1 and 2, a hitch member 70 is pivotally mounted on front frame member 22 of the center section 12 in a conventional manner. Hitch member 70 includes a pair of forwardy converging hitch frame members 72, 74 which coaxially pivotally connected with front frame member 22 and terminate at a hitch plate or connector 76, which turn is connected with the tractor drawbar. Mounted between the converging hitch frame members 72, 74 is a transverse or cross frame members 78. A longitudinal hitch frame member 80 extends from the cross frame member 78 to the connector 76.

Pivotally supported on the longitudinal frame member 80 is a lever 82 which is connected through motion transmitting rods 84 with brackets 86 mounted on connecting member 26 in the center section 12. Lever 82 is caused to pivot in a fore and aft direction by an extensible and retractable power means in the form of a hydraulic ram 88, the cylinder portion of which is pivotally mounted on the longitudinal hitch frame member 80, and the piston portion of which is pivotally connected with lever 82 intermediate its ends. Extension of the ram as shown in FIG. 2 causes lever 82 to pivot in a clockwise direction, or toward the tractor, relative to hitch frame member 80.

The center section 12 is provided with a pair of main ground wheels 90 mounted on support arms 92 welded or otherwise secured to the center section 12. Each of the side sections are provided with an auxiliary ground wheel 94 rotatably mounted on the end of a support arm 96 secured to the respective frame members 14 and 16. In the extended working position of the implement as shown in FIG. 1, tension rods 98 may be connected between the connector 76 and the side sections to relieve the strain on the hinge means 20 during earthworking operations.

As pointed out above, during earthworking operations, the locking pin 56 is mounted in the locking ears 58 on the folding hinge permitting free pivotal movement of the side sections 14 and 16 about the working axis X—X. When the earthworking operations have been completed, the locking pin 56 is removed from the ears 58 to permit pivotal movement of the side sections relative to the center section about both axis X—X and axis Y—Y. The tension rods 98 are removed and ram 88 is extended its full stroke to in turn cause the center and side sections to tilt forwardly about the pivotal connection between hitch frame members 72, 74 and front frame member 22 to an angle $c$ (FIG. 8) relative to the horizontal which is complementary to the sum of the vertical and horizontal angles of inclination $a$ and $b$, respectively, of the folding axis relative to the working axis. During this forward tilting, wheels 90 and 94 are pivoted downwardly and rearwardly, thus elevating the center and side sections 12, 14, 16 which are supported by the wheels to relieve strain on the hinge means 20. The side sections can then be folded forwardly about both axis X—X and axis Y—Y by merely pushing the outer ends of the side sections forwardly to roll the wheels 94 to the position shown approximately in FIG. 2. Since the side sections can pivot about both axis X—X and axis Y—Y, the wheels 94 remain in ground contact and support the side sections during the entire folding operation. However, the resultant effect is of folding the side sections about axis Y—Y only. Folding could also be accomplished by placing pin 56 in holes 54 and opening 52 to preclude movement about axis X—X, although during folding about axis Y—Y only, wheels 94 could leave the ground for a short time, depending on the particular design geometry of the implement and the size of wheels used. As illustrated in FIG. 8, when the center section 12 is tilted forwardly to an angle $c$ with respect to the horizontal, axis X—X assumes the vertical at an angle of $a+b$ to the plane of the center section when the side section is pivoted approximately ninety degrees about axis Y—Y. It is apparent in FIG. 8 that the sum of angles $a$, $b$ and $c$ is ninety degrees. Therefore, the center section is tilted to an angle relative to the horizontal that is complementary to the sum of the angles of inclination $a$ and $b$ in order to fold the side sections forwardly. The locking pin is now inserted into the locking holes 52 and 54 of the working hinge to prevent pivotal movement about axis X—X.

Ram 88 may then be retracted slightly to lift the wheels 94 off the ground and permit the side sections to be swung into engagement with a support bracket 102 carried at the end of a support beam 100 for the side sections. As shown in FIG. 2, the ram may be retracted until wheels 94 are held approximately 6–8 inches above the ground for transport. To return to the earthworking positions from the transport position of FIG. 2, the side sections are disengaged from bracket 102 and the ram is then extended fully to lower wheels 94 onto the ground, in which position the center section will be in a transverse plane tilted forwardly about the axes of wheels 90 to angle $c$ of FIG. 8. The locking pin is removed from holes 52 and 54 to free the working hinge. The side sections are then swung about both axis X—X and axis Y—Y while supported on wheels 94 until the folding hinge closes to the position shown in FIG. 6. The locking pin 56 is inserted into the locking ears 58. The ram is then retracted to place the entire implement in the working position shown in FIG. 1.

While a specific example of the invention has been illustrated and described, other forms falling within the scope and spirit of the invention will be apparent to those skilled in the art.

We claim:

1. A multiple section earthworking implement comprising: a draft frame adapted to be pulled by a towing vehicle, a laterally extending center section movably mounted on the draft frame and having a plurality of earthworking tools depending therefrom, a side section extending laterally from one end of the center section and having a plurality of earthworking tools depending therefrom, connecting means interconnecting the center and side sections in coplanar relation in a horizontal earthworking position, the connecting means including first hinge means defining a first hinge axis between the center and side sections extending longitudinally in the earthworking position to accommodate undulations in the earth by enabling relative vertical pivotal movement between the sections, power means for elevating both sections relative to the draft frame from the horizontal earthworking position through a predetermined angle to an elevated position to disengage the tools from the earth, the connecting means further including second hinge means defining a second hinge axis between the center and side sections, the second hinge axis in the horizontal earthworking position laterally diverging from the first hinge axis a predetermined second angle and vertically diverging therefrom a predetermined third angle, the sum of the second and third angles being complementary to the first angle, the side section being movable about the second hinge axis from the elevated position to a substantially longitudinally extending transport position lying in a substantially vertical plane, and lock means for locking the second hinge means in the horizontal working position to enable relative pivotal movement between the center and side sections about the first hinge axis only.

2. The implement of claim 1, wherein: the first hinge means include a universal hinge member between the center and side sections and a spaced fixed-axis hinge member between the center and side sections defining together the first hinge axis, and the second hinge means include the universal hinge member and a second spaced fixed-axis hinge member between the center and side sections defining together the second hinge axis.

3. The implement of claim 1, including: a ground engaging wheel depending from each section to support that section in the horizontal earthworking position, the sections being supported by the wheels during elevation by the power means to the elevated position, and the side section wheel supporting the side section during movement to the transport position.

4. The implement of claim 2, wherein: the first angle is approximately 60°, and the second and third angles are substantially equal.

5. A multiple section earthworking implement comprising: a draft frame adapted to be pulled by a towing vehicle, a laterally extending center section pivotally mounted on the draft frame and having a plurality of earthworking tools depending therefrom, a side section extending laterally from each end of the center section and each having a plurality of earthworking tools depending therefrom, connecting means interconnecting the center section and each side section in coplanar relation in a horizontal earthworking position, each connecting means including first hinge means defining a first hinge axis between the center and side sections extending longitudinally in the earthworking position to accommodate undulations in the earth by enabling relative vertical pivotal movement between the sections, power means for pivoting the center and both side sections relative to the draft frame from the horizontal earthworking position through an approximately 60° angle to an elevated position to disengage the tools from the earth, each connecting means further including second hinge means defining a second hinge axis between the center and side sections, the second hinge axis in the horizontal earthworking position laterally diverging from the first hinge axis a predetermined second angle and vertically diverging therefrom a predetermined third angle approximately equal to the second angle, the sum of the second and third angles being complementary to the first angle, each side section being movable forwardly about the second hinge axis from the elevated position to a substantially longitudinally extending transport position lying in a substantially vertical plane, lock means for locking the second hinge means in the horizontal working position to enable relative pivotal movement between the center and side sections about the first hinge axis only, and a ground engaging wheel depending from each section to support that section in the horizontal earthworking position, the sections being supported by the wheels during elevation by the power means to the elevated position, and the side section wheels supporting the side sections during movement to the transport position.

6. The implement of claim 5, wherein: the first hinge means include a universal hinge member between the center and side sections and a spaced fixed-axis hinge member between the center and side sections defining together the first hinge axis, the second hinge means include the universal hinge member and a second spaced fixed-axis hinge member between the center and side sections defining together the second hinge axis.

References Cited

UNITED STATES PATENTS

| | | | |
|---|---|---|---|
| 1,927,458 | 9/1933 | Klise | 172—311 X |
| 2,970,658 | 2/1961 | Kopaska | 172—456 |
| 3,327,787 | 6/1967 | Adee | 172—311 |
| 3,373,822 | 3/1968 | Hornung | 172—311 |
| 3,428,333 | 2/1969 | Nelson | 172—456 X |

ROBERT E. PULFREY, Primary Examiner

A. E. KOPECKI, Assistant Examiner

U.S. Cl. X.R.

16—163, 676; 172—456